(12) United States Patent
Warshavsky et al.

(10) Patent No.: US 7,805,474 B2
(45) Date of Patent: Sep. 28, 2010

(54) METHOD AND APPARATUS FOR MAPPING BETWEEN XML AND RELATIONAL REPRESENTATIONS

(75) Inventors: Alex S. Warshavsky, San Francisco, CA (US); Chandrakant R. Bhavsar, Foster City, CA (US); Jeffrey M. Fischer, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 325 days.

(21) Appl. No.: 12/110,498

(22) Filed: Apr. 28, 2008

(65) Prior Publication Data
US 2008/0201359 A1 Aug. 21, 2008

Related U.S. Application Data

(63) Continuation of application No. 10/832,790, filed on Apr. 26, 2004, now Pat. No. 7,366,717, which is a continuation of application No. 09/835,162, filed on Apr. 13, 2001, now Pat. No. 6,732,095.

(51) Int. Cl.
*G06F 17/30* (2006.01)
*G06F 7/00* (2006.01)
*G06F 17/00* (2006.01)

(52) U.S. Cl. .................... 707/956; 707/954
(58) Field of Classification Search ............ 707/954, 707/956
See application file for complete search history.

(56) References Cited

U.S. PATENT DOCUMENTS

| 6,366,934 | B1 * | 4/2002 | Cheng et al. ............. 715/210 |
| 6,604,100 | B1 * | 8/2003 | Fernandez et al. ............ 1/1 |
| 6,611,843 | B1 * | 8/2003 | Jacobs ..................... 1/1 |
| 6,871,204 | B2 * | 3/2005 | Krishnaprasad et al. ........ 1/1 |
| 7,024,425 | B2 * | 4/2006 | Krishnaprasad et al. ........ 1/1 |
| 7,043,487 | B2 * | 5/2006 | Krishnamurthy et al. .... 707/804 |

* cited by examiner

*Primary Examiner*—Yicun Wu
(74) *Attorney, Agent, or Firm*—Campbell Stephenson LLP (57) ABSTRACT

A method to convert data between a relational format and an XML document, by creating a set of XML Mapping Definition from metadata; selecting relational data from a relational application database, and converting the relational data to the XML document using the set of XML Mapping Definition.

18 Claims, 3 Drawing Sheets

METHOD AND APPARATUS FOR MAPPING BETWEEN XML AND RELATIONAL REPRESENTATIONS

RELATED APPLICATIONS

This application is a continuation of U.S. patent application Ser. No. 10/832,790 entitled "Method and Apparatus for Mapping Between XML and Relational Representations," filed on Apr. 26, 2004 now U.S. Pat. No. 7,366,717 and naming Alex S. Warshavsky, Chandrakant R. Bhavsar, and Jeffrey M. Fischer as inventors, which is a continuation of U.S. patent application Ser. No. 09/835,162 entitled "Method and Apparatus for Mapping Between XML and Relational Representations," filed on Apr. 13, 2001 and naming Alex S. Warshavsky, Chandrakant R. Bhavsar, and Jeffrey M. Fischer as inventors, now U.S. Pat. No. 6,732,095. The above-mentioned applications are incorporated by reference herein, in their entirety and for all purposes.

FIELD OF INVENTION

This invention relates to computer systems, and more specifically to a method and system for conversion between a relational database and an XML document.

BACKGROUND OF THE INVENTION

The WWW is a distributed hypermedia system constructed on the Internet, a global system of heterogeneous networked computers. Advances in networking and Web/Internet technology are leading to a network-centric computing model, and the Web and Internet are evolving into the infrastructure for global network computing. By populating this infrastructure with object-based components and combining them in various ways, one can enable the development and deployment of interoperable distributed object systems on the Web. The marriage of the Web with objects presents a compelling computing model. The object model provides the ability to mimic real world process in a fluid, dynamic and natural way. The Web allows for objects to be distributed to servers thereby centralizing access, processing, and maintenance, provides a multiplexing interface to distributed objects, and allows thin-clients. There is an emergence of an industry that provides Web and object interfaces to distributed object tools. Additionally, the Web is considered to be the platform for next-generation business applications. Business objects mirror the business itself, allow process, policy, data and definitions to be shared, and enable the business process to be re-engineered.

XML (extensible markup language) is a markup language for documents containing structured information. Structured information contains both content (words, pictures, etc.) and some indication of what role that content plays or an indication of relationships between the content items. A markup language is a mechanism to identify these structures in a document. The XML specification defines a standard way to add markup to documents, and was created so that richly structured documents could be used over the web. XML documents have three major features. The first feature is that Elements have a name, zero or more attributes, and zero or more children where these children may be either text or additional elements. Second, Attributes are name/value pairs that appear inside of elements, and finally, Arbitrary text may appear within an element.

The XML markup language has several properties that make it useful for representing business data. XML documents are hierarchical—each element in the document has a parent (except the document root, which has no parent) and zero or more children. The ordering of elements and text in a document is significant and there are standard "metadata" formats for defining the allowable structures of a document that includes DTD and XML Schema.

Most business data is stored at some point in a relational database. Relational databases have a different structure for representing data than XML documents. Relational schemas contain a set of tables where each table contains an un-ordered set of records that have a fixed set of data fields known as columns. Tables are related to each other through foreign key relationships, which may take the form of an arbitrary graph. Business applications may access this database directly or provide a layer of software on the data model that is more convenient for access in memory.

XML is frequently used to pass business data between applications or partner companies, while the relational data model is used for the internal storage of the same data. This implies that the data must be transformed between the relational representation and the XML representation. This can be labor intensive if software must be written for each unique XML document type.

SUMMARY OF THE INVENTION

A method to convert data between a relational format and an XML document, by creating a set of XML Mapping Definition metadata from XML schema metadata or DTD using a Wizard. Relational data can be selected from a relational application database and converted to an XML document using the set of XML Mapping Definition.

The method can convert an XML document back to the relational data using the set of XML Mapping Definition; and the relational data converted from the XML document can be stored in an application database.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for transferring relational data in an XML document over a network, is disclosed. In the following description, for purposes of explanation, specific nomenclature is set forth to provide a thorough understanding of the present invention. However, it will be apparent to one skilled in the art that these specific details are not required in order to practice the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable or machine readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. The computer program may be executed by a variety of machines having some attributes associated with a general purpose computer.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

The flexible XML system has a metadata schema that permits the definition of mappings between a relational data representation and XML documents. This schema is called the XML Mapping Definition. It consists of three entities: Object, Component, and Field. The Object identifies a specific group of tables and a single XML document to be mapped. The Object contains global information, such as the document's root XML element name. Each Object has a set of components, which are organized in a hierarchy with exactly one root component. A Component defines a mapping between a relational table and XML elements. Two XML elements may be specified for the table, one for the individual records and an optional element to group records belonging to the table. A Component contains zero or more fields. A Field defines the mapping between a column in the Components table to either an XML element or an XML attribute. The fields within a component may map to a hierarchy of element and attributes in the XML document.

The XML Mapping Definition may be automatically populated through a Metadata Wizard. There are two general types of wizards. The first creates the mapping definition from an external XML metadata description (e.g. XML DTD or XML Schema). The XML portion of the mapping is fixed by the external metadata, but the relational portion is defined by the wizard. The wizard may either define a simple mapping where each element of the XML document is associated with a table or it may collapse portions of the XML hierarchy to minimize the number of tables needed to hold the data.

A second type of Metadata Wizard can create the mapping definition from a relational schema subset. The relational portion of the mapping is fixed by the relational schema, but the XML portion is defined by the wizard. The Metadata Wizard uses a simple algorithm to create the mapping—each table becomes a component, each column a field, with both being mapped to XML elements. The names of the XML elements are based on the table and column names but are first processed to create valid XML tags. This mapping can be manually changed after the Object is created to adjust the XML representation (for example, to meet the requirements of an external system).

Once the mapping definition is created, a software component known as the XML Converter, can be used for automatic conversion between XML documents and relational data. For generating XML documents, the XML converter matches the relational tables, records, and columns to the objects, components, and fields of a mapping definition and then utilizes the metadata to generate an XML document with elements and attributes. For conversion of an XML document to relational data, the XML converter matches elements and attributes in the XML to the components and fields and then uses the relational metadata to map the data to tables, records, and columns.

Figure 1:
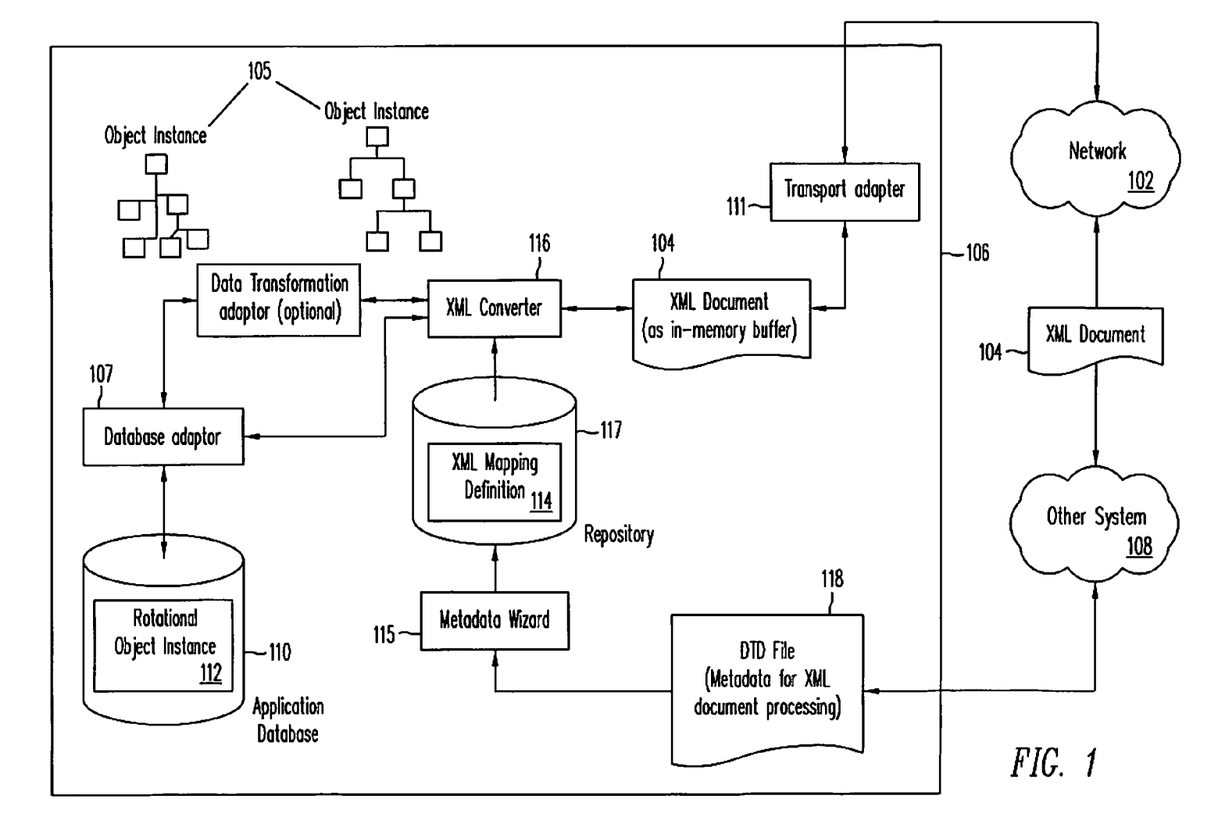
FIG. 1 is an embodiment of a flow diagram of a Flexible XML System.

FIG. 1 is an illustration of a flexible XML system. The flexible XML system 100 is a method and apparatus for automatic conversion between relational data and XML data that can be used to transfer the relational data across a network 102. The relational data transferred across the network 102 can be in the form of an XML document 104 using a generic approach involving metadata configuration that may or may not need document specific programming. The flexible XML system 100 can apply to both dealing with data directly via relational database access or via caching/business logic layer if provided. A transport adapter 111 can be used to read/write XML documents to/from network and provide access to them in computer memory.

In one embodiment, the relational data is transferred between a first computer system 106 and a second computer system 108, where each computer system 106 and 108 might be managed by a different company. The two computer systems 106 and 108, both connected to a common network 102 such as the Internet, can be located remotely. The relational data is stored in an application database 110 as records in relational tables with columns 112. A subset of related tables can be referred to as a Relational Object Instance. Object instances encapsulate data and business processes. The Relational Object Instance 112 may include, for example, information on an employee or a sales order that is modeled as a business object in a business application system. A metadata schema is proposed that permits the definition of mappings between the relational data representation and XML documents. This metadata schema is called the XML Mapping Definition and once a set of XML Mapping Definitions 114 are created, may be stored in a location such as a repository 117.

The typical integration project involves transporting data from one application to another. An XML Mapping Definition builder 115 known as an XML Metadata Wizard is used to create new XML Mapping Definitions 114 from an external XML metadata description (e.g. XML DTD or XML Schema) 118 that is shared by the two computer systems 106 and 108.

An XML converter 116 maps the set of relational data to an XML document 104 using the set of XML Mapping Definitions 114 constructed for a particular application. The XML converter 116 can be bi-directional in that it can convert an XML document 104 to relational data 112 as well.

XML Mapping Definition 114 consists of three entities: Object, Component, and Field. An Object identifies a specific group of tables and a single XML document to be mapped. The Object contains global information, such as the document's root XML element name. Each Object has a set of components where these components are organized in a hierarchy that can have only one root component.

A Component defines a mapping between a relational table and XML elements. Two XML elements may be specified for the table: one for the individual records and an optional element to group records belonging to the table. A Component contains zero or more fields. A Field defines the mapping between a column in the Component's table to either an XML element or an XML attribute. The fields within a component may map to a hierarchy of elements and attributes in the XML document.

The XML Mapping Definition 114 may be automatically populated through use of the Metadata Wizard 115. In one embodiment, the Metadata Wizard 115 is an XML Metadata Wizard and the XML portion of the mapping is fixed by the external metadata, but the default relational portion can be defined by the XML Metadata Wizard. The XML Metadata Wizard may either define a simple mapping where each element of the XML document 104 is associated with a table or it may collapse portions of the XML hierarchy to minimize the number of tables needed to hold the data.

In one embodiment, another type of Metadata Wizard 115, known as a Relational Metadata Wizard can also create the XML Mapping Definition 114 from a relational schema subset. The relational portion of the mapping can be fixed by the relational schema but the XML portion can be defined by the Relational Metadata Wizard. The Metadata Wizard can use a simple algorithm to create the mapping where each table becomes a component, each column a field, with both being mapped to XML elements. The names of the XML elements can be based on the table and column names but may first be processed to create valid XML tags. This mapping can be manually changed after the Object is created to adjust the XML representation (for example, to meet the requirements of an external system).

Figure 2:
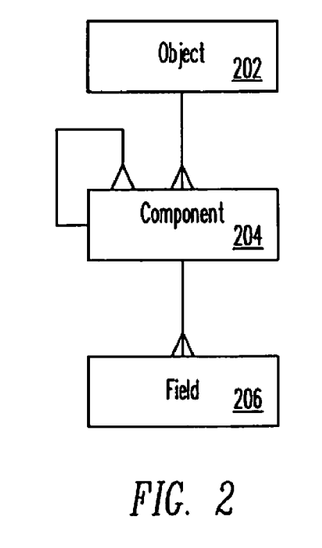
FIG. 2 is an Entity-relationship diagram for one embodiment of an XML Mapping Schema.

FIG. 2 is an Entity-Relationship diagram of the mapping schema for the XML Mapping Definition in one embodiment. There are three entities: Objects 202, Component 204, and Fields 206. There is a one-to-many relationship between objects 202 and components 204. There is also a one-to-many relationship between components 204—this is used to represent the component hierarchy within an object. Lastly, there is a one-to-many relationship between components 204 and fields 206.

In one embodiment, the following Table 1 summarizes the properties of the object definition of the XML Mapping Definition.

TABLE 1

| Property Name | Data Type | Usage |
| --- | --- | --- |
| Name | String | Name of the object |
| XML Tag | String | Object level element tag (optional). |
| Open Content | Boolean | If true, ignore any undefined XML tags that appear in a document instance. If false, generate a validation error when undefined tags are encountered. |

TABLE 1-continued

| Property Name | Data Type | Usage |
| --- | --- | --- |

In one embodiment, the following Table 2 summarizes the properties of the component definition of the XML Mapping Definition.

TABLE 2

| Property Name | Data Type | Usage |
| --- | --- | --- |
| Name | String | Name of the component. |
| Table Name | String | Name of the table that maps to this component. |
| XML Tag | String | XML Element Tag for records of this component. |
| Container XML Tag | String | Optional XML Element for grouping elements of this component. |
| XML Sequence | Integer | Sequence number used to order this element within parent component's element. |
| Cardinality | String | Relationship with parent component: Zero or One, Zero or More, One, One or More. |

In one embodiment, the following Table 3 summarizes the properties of the field definition of the XML Mapping Definition.

TABLE 3

| Property Name | Data Type | Usage |
| --- | --- | --- |
| Name | String | Name of the field. |
| Column Name | String | Name of the column that maps to this field. |
| Data Type | String | The data type of the field |
| XML Tag | String | XML tag for this field. |
| XML Style | String | Element or Attribute. |
| XML Sequence | Integer | If XML Style = "Element", sequence number used to order this element within parent component's element. |
| XML Parent Field | String | Name of the field that represents a parent element in XML. Only fields with XML Style of Element can be parent fields. This allows creation of field hierarchies in the XML document |
| XML Literal Value | String | Default field value for XML generation |

Figure 3:
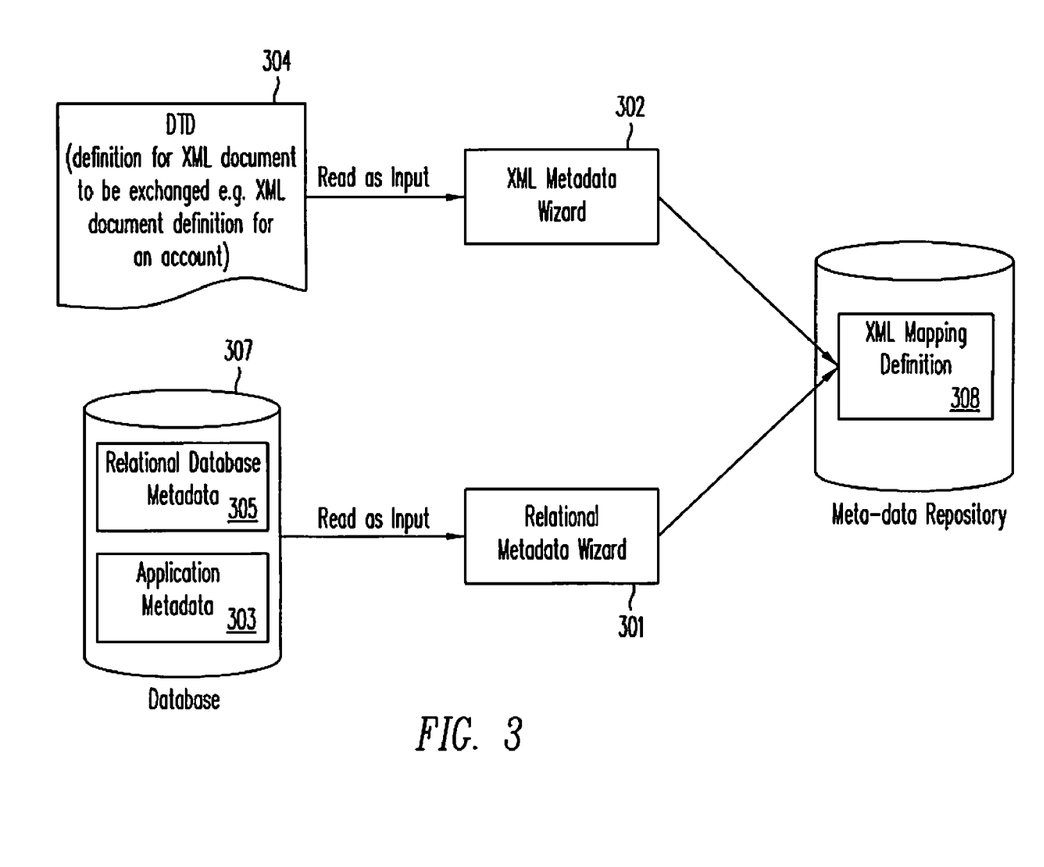
FIG. 3 is a flowchart of an embodiment of a conversion of DTD to a set of XML Mapping Definition.

Referring to FIG. 3, in one embodiment, the input for the Relational Metadata Wizard 301 can be a set of table, column and foreign key definitions of application database 307. These definitions may be stored in the database's data dictionary 305 or in the application metadata repository 303. One table could be identified as the "primary" of the set. A subset of the foreign key relationships could be selected such that the tables form a hierarchy of parent-child relationships, rooted at the primary table. This could be done manually or through a simple algorithm, which follows all foreign key relationships starting from the primary table and then removes any cycles.

In one embodiment, the following rules can be used by a Relational Metadata Wizard 301 to generate the XML mapping. XML tag names can be generated from the relational table and column names. To ensure that a valid XML document is defined, characters illegal for XML tags could be removed from the tag name. In addition, XML tags can be made unique by using a unique numeric suffix added to a tag if the tag with the same name already exists. Element tags for components and fields within an object can be unique with one possible exception: if fields inside different components have the same data type, then the XML tag can be kept the same, and Attribute tags can be made unique within parent element.

An Object can be created for the hierarchy of tables. The XML tag of this object can be defaulted to "ListOf"+<root component table name>. A Component can be created for each table in the hierarchy. Parent-child relationships between the components can be created based upon those of the tables. The XML tag for each component can be created based on the name of the associated table. As mentioned above, illegal XML characters can be removed from the name and can be made unique. The Container XML Tag for each component can be set to "ListOf"+<XML Tag Name>. The Container can be left blank for the root component. The cardinality of the Component can be set according to any cardinality information provided by the relational metadata. If not available, the cardinality can default to "Zero or More". A Field can be created for each column within the Component's table where the XML tag for the field is based on the column name. XML Style for each field can default to an Element that can be later changed. The data type of the field can be based on the data type of the corresponding column in the database Referring back to FIG. 1, once the XML Mapping Definition 114 is created, the software component known as the XML Converter 116 can be used for automatic conversion between XML documents 104 and relational data 112. For generating XML documents 104 from relational data 112, the XML Converter 116 matches the relational tables, records, and columns to the Objects, Components, and Fields of the XML Mapping Definition 114 and then utilizes the metadata 114 to generate an XML document 104 with elements and attributes. For conversion of an XML document 104 to relational data 112, the XML Converter 116 matches elements and attributes in the XML document 104 to the components and fields in the XML mapping definition 114 which is used to create data for tables, records, and columns.

Referring to FIG. 1, the two computer systems 106 and 108 could first exchange document type definition (DTD) information 118. The DTD 118 can be processed by the XML Metadata Wizard 115 to create the XML Mapping Definition 114 corresponding to the DTD 118. This definition 114 contains a mapping between XML documents compliant to the DTD 118 and Object instances (objects, components, and fields) 105 containing the same data in a relational representation. XML Mapping Definitions 114 can be maintained on-site at a storage location or repository.

In one embodiment, the algorithm for relational to XML conversion can be implemented as follows. First, an XML element for the Object is created if the XML tag is present in the metadata. Then, starting with the root component, traverse the component and field hierarchy based on XML sequence in the metadata. This may only be valid for those fields that have XML Style of element. Next, for each component type (there could be many records in a table) create an XML container element if present in the metadata. For each component (record) create an XML element. For each field create an XML element or attribute and if present, child XML fields can be processed in the order of their XML sequence. XML elements or attributes can be created in the parent XML element based on the XML style. If there is no relational data for a field and an XML literal value is specified for that field, then the XML literal value can be used to populate the value of the field in the XML document.

In one embodiment, the algorithm for XML to relational conversion creates an Object Instance for the XML document instance. Starting with root component, traverse the element hierarchy in the order of elements in the XML document. Some state information can be kept to remember the current position within the Object instance (e.g. current component or field being processed). For each element using the current position in the Object Instance, XML tag and XML tag of the parent element (except for the root), search the metadata to find a child element whose tag matches the current XML tag. If a component container element is found, the traversal simply continues to its child elements. However, when components are created for the child elements, they may be checked to verify they are consistent with the type of the container. If a matching field is found, then populate the field value in the current component record. The parent element can be validated (it can either be a Component or a parent XML field element). If a matching component is found, a new child record can be created in the current component. This new record can become the current component.

Referring back to FIG. 3, the Metadata Wizard 302 can create XML Mapping Definitions 308 to place relational data in an XML format. In order to generate the XML Mapping Definition 308, the Metadata Wizard 302 takes the necessary values from DTD 304 and maps them to the appropriate XML Mapping Definition fields. The input for this wizard is the DTD where entities in the DTD are literally expanded.

In one embodiment, the following rules can be used to generate the XML mapping. First, XML tag names can be generated from the names of elements and attributes in the DTD. If necessary, XML tags can be made unique by adding a unique numeric suffix to a tag if a tag with the same name already exists. The XML tags can be made unique where Element tags for components and fields within an object are unique with one exception: if fields inside different components have the same data type, then tag is kept the same. Attribute tags are made unique within a parent element.

A component is created corresponding to DTD elements with either of the following properties: the element's cardinality in its parent element is either zero or more, or one or more or the elements have itself as its child element. Parent-child relationships between the components are created based upon those of the elements in the DTD.

Certain elements in the DTD may be represented as either components or fields, depending on the setting of a configuration parameter: "Minimize number of components". These elements must satisfy all three of the following properties: the element's cardinality in its parent element is either "Zero or One", or "One", and all children elements of this element have this property recursively and, the element cannot have itself as its child element If the parameter is set to "true", then such elements become fields in their parent element's component. Otherwise a separate component is created for each element. If such elements are mapped to components, parent-child relationships between the components are created based upon those of the elements in the DTD. If such components are mapped to fields, parent-child relationships between the fields, using the XML Parent Field property are created based upon those of the elements in the DTD.

If a DTD element can have itself as a child element, for the component corresponding to this DTD element, no child component corresponding to the same DTD element is created. Instead, the Hierarchy property on the component is set to "true". The XML tag for each component is created based on the name of the associated element making it unique. The cardinality of the Component is set according to the cardinality for the corresponding DTD element in its parent DTD element. A Field is created for each attribute within the Component's DTD element. The XML tag for the field is based on the attribute name.

DTD syntax allows an element to have itself as its descendent. Such property can lead to a potential infinite loop through recursion. However, the corresponding XML mapping schema prevents an infinite loop with the following approach: if a component corresponding to a DTD element creates another descendent component corresponding to the same DTD element, for the newly created component, no further children components are created. If a field corresponds to a DTD element, its XML style is set to "Element". If it corresponds to an attribute in the DTD, its XML style is set to "Attribute".

For one embodiment, Table 4 below provides a list of the detailed rules that can be used for mapping.

TABLE 4

Rules for Mapping between DTD and XML Mapping Definition

| DTD | XML Mapping Definition | | Comment |
|---|---|---|---|
| Element | Option 1 (create an component for each element) | Component | |
| | Option 2 (Minimize number of components) | Component Field Component | If fulfilling three properties listed above Otherwise |
| Attribute | Component field | | Component Field property: XMLStyle = attribute |
| Child element | Child component | | |
| Child element sequence | Component property "XML sequence". | | |
| Child element cardinality | Component property "cardinality" | | Use the cardinality closest to the element. |
| Repeated child elements | Components with different names, but same XML tag, and increment the external name sequence | | |
| \| Relationship between elements | Not supported, will be treated as "," | | |
| Entities | Not supported | | |
| Attributes that has data type enumerated | Not mapped | | |

In one embodiment, Table 5 below can provide detailed mapping for cardinality.

TABLE 5

Rules for mapping for cardinality

| DTD element occurrence operator | | XML Mapping Definition component cardinality property | |
|---|---|---|---|
| ? | Appear 0 or 1 time | "Zero or One" | Appear 0 or 1 time |
| + | Appear 1 or more times | "One or More" | Appear 1 or more times |
| * | May appear 0 or more times | "Zero or More" | May appear 0 or more times |
| No modifier | Appear exactly one time | "One" | Appear exactly one time |

Now that the general rules for mapping, in one embodiment, have been provided, the XML Mapping Definition can be evaluated to define the mapping to a property level.

Figure 4A:
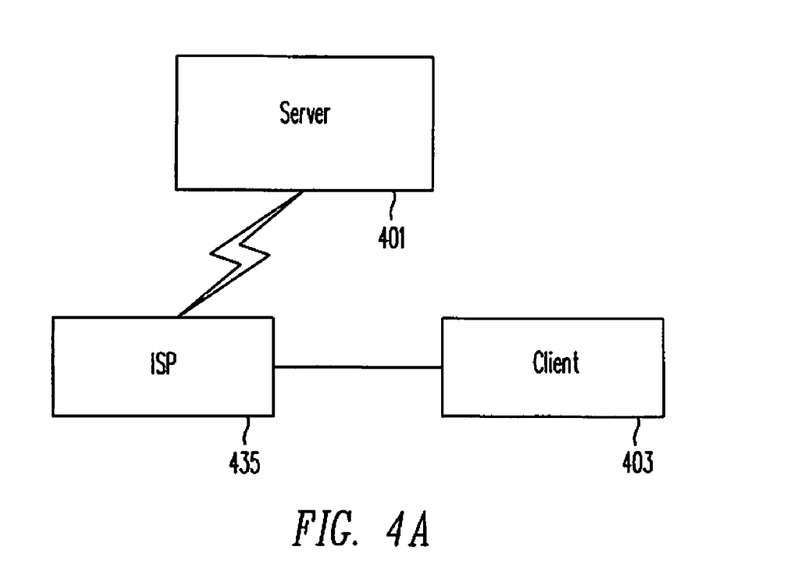
FIG. 4A is an embodiment of a networked system of computers.
Figure 4B:
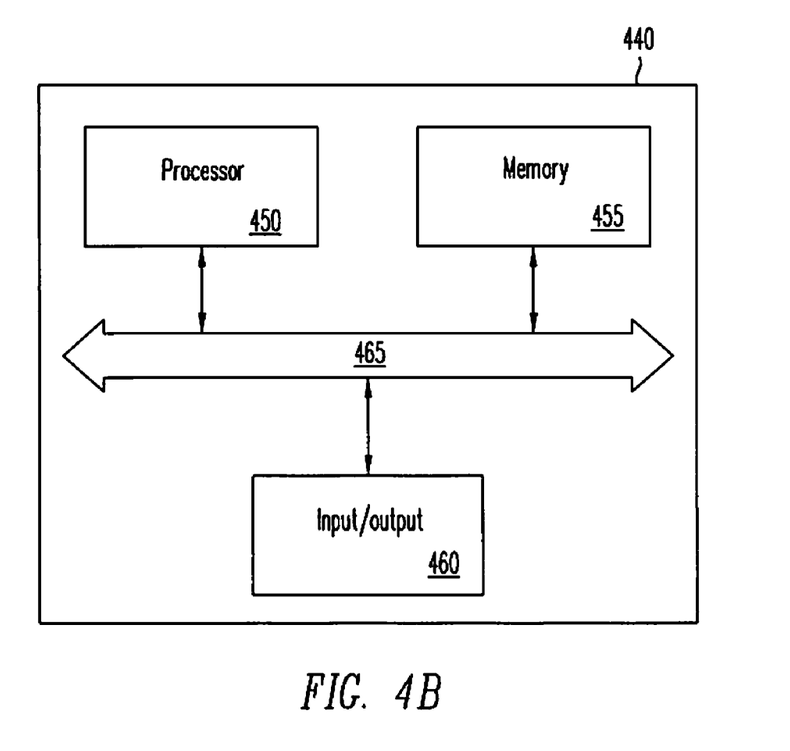
FIG. 4B is an embodiment of a machine such as a computer.

The descriptions in FIGS. 4A & 4B are intended to provide an overview of computer hardware and other operating components suitable for implementing the invention, but it is not intended to limit the applicable environments. FIG. 4A illustrates an embodiment of a networked system of computers such as may be associated with the World Wide Web for example. Server 401 is coupled to ISP (Internet Service Provider) 435 through a network such as the World Wide Web. Client 403 is a client device such as an end-user computer or other end-user terminal, and client 403 is coupled to ISP 435. Thus, communication may be achieved between client 403 and server 401.

FIG. 4B illustrates an embodiment of a machine such as a computer, which may be suitable for implementation of client 403, server 401, or both. Machine 440 includes processor 450, memory 455, input/output 460 and bus 465. Bus 465 is coupled to each of processor 450, memory 455 and input/output 460, allowing communication and control therebetween.

In the foregoing, the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. The present specification and figures are accordingly to be regarded as illustrative rather than restrictive.

We claim:

1. An apparatus for converting data between a relational format and an XML document, the apparatus comprising:
   a relational application database containing relational data;
   means for creating an XML Mapping Definition from metadata, wherein
      the XML Mapping Definition comprises information relating relational data components to XML elements and relational data fields to XML elements or XML attributes, and
      said means for creating the XML Mapping Definition comprises means for collapsing one or more portions of an XML hierarchy comprising the XML elements and attributes to reduce the number of tables used in the relational application database;
   means for selecting relational data from the relational application database;
   means for converting the relational data to XML data using the XML Mapping Definition; and means for storing the converted relational data in the XML document.

2. The apparatus of claim 1 further comprising:
means for converting the XML document to relational data using the XML Mapping Definition; and
means for storing the relational data converted from the XML document.

3. The apparatus of claim 2 further comprising:
means for generating the XML Mapping Definition from DTD metadata.

4. A computer-readable storage medium comprising:
a first set of instructions, executable by a processor, configured to create an XML Mapping Definition from metadata, wherein
the XML Mapping Definition comprises information relating relational data components to XML elements and relational data fields to XML elements or XML attributes, and
said first set of instructions further comprises a second set of instructions, executable by the processor, configured to collapse one or more portions of an XML hierarchy comprising the XML elements and attributes to reduce the number of tables used in a relational application database;
a third set of instructions, executable by the processor, configured to select relational data from the relational application database;
a fourth set of instructions, executable by the processor, configured to convert the relational data to XML data using the XML Mapping Definition; and
a fifth set of instructions, executable by the processor, configured to store the converted relational data in the XML document.

5. The computer-readable storage medium of claim 4 further comprising:
a sixth set of instructions, executable by the processor, configured to convert the XML document to relational data using the XML Mapping Definition; and
a seventh set of instructions, executable by the processor, configured to store the relational data converted from the XML document.

6. The computer-readable storage medium of claim 5 further comprising:
an eighth set of instructions, executable by the processor, configured to generate the XML Mapping Definition from DTD metadata.

7. A system for converting data between a relational format and an XML document, the system comprising:
a processor;
a relational application database, coupled to the processor, and containing relational data;
a memory, coupled to the processor, and storing instructions for performing a method, the method comprising:
creating an XML Mapping Definition from metadata, wherein
the XML Mapping Definition comprises information relating relational data components to XML elements and relational data fields to XML elements or XML attributes, and
said creating the XML Mapping Definition comprises collapsing one or more portions of an XML hierarchy comprising the XML elements and attributes to reduce the number of tables used in a relational application database;
selecting relational data from the relational application database;
converting the relational data to XML data using the XML Mapping Definition; and
storing the converted relational data in the XML document.

8. The system of claim 7 wherein the memory stores further instructions for performing the method, the method further comprising:
converting the XML document to relational data using the XML Mapping Definition; and
storing the relational data converted from the XML document.

9. The system of claim 8 wherein the memory stores further instructions for performing the method, the method further comprising:
generating the XML Mapping Definition from DTD metadata.

10. An apparatus for converting data between a relational format and an XML document, the apparatus comprising:
a relational database containing relational data;
means for generating a XML Mapping Definition from XML or Relational metadata, wherein
the XML Mapping Definition comprises information relating relational data components to XML elements and relational data fields to XML elements or XML attributes, and
said means for generating the XML Mapping Definition comprises collapsing one or more portions of an XML hierarchy comprising the XML elements and attributes to reduce the number of tables used in the relational database;
means for selecting relational data from the relational database;
means for representing the relational data as an object instance;
means for converting the object instance to XML data using the XML Mapping Definition; and
means for storing the converted object instance in the XML document.

11. The apparatus of claim 10 further comprising:
means for obtaining the XML document;
means for converting the XML document to an object instance with the XML Mapping Definition;
means for representing the object instance as relational data; and
means for placing the relational data in the relational database.

12. The apparatus of claim 11 wherein said means for converting further comprises:
means for translating between the object instance and the XML document using the XML Mapping Definition.

13. A computer-readable storage medium comprising:
a first set of instructions, executable by a processor, configured to generate a XML Mapping Definition from XML or Relational metadata, wherein
the XML Mapping Definition comprises information relating relational data components to XML elements and relational data fields to XML elements or XML attributes, and
said first set of instructions comprises a second set of instructions, executable by the processor, configured to collapse one or more portions of an XML hierarchy comprising the XML elements and attributes to reduce the number of tables used in a relational database;
a third set of instructions, executable by the processor, configured to select relational data from the relational database;

a fourth set of instructions, executable by the processor, configured to represent the relational data as an object instance;

a fifth set of instructions, executable by the processor, configured to convert the object instance to XML data using the XML Mapping Definition; and a sixth set of instructions, executable by the processor, configured to store the converted object instance in the XML document.

14. The computer-readable storage medium of claim 13 further comprising:

a seventh set of instructions, executable by the processor, configured to obtain the XML document;

an eighth set of instructions, executable by the processor, configured to convert the XML document to an object instance with the XML Mapping Definition;

a ninth set of instructions, executable by the processor, configured to represent the object instance as relational data; and a tenth set of instructions, executable by the processor, configured to place the relational data in the relational database.

15. The computer-readable storage medium of claim 14 wherein said eighth set of instructions further comprises:

an eleventh set of instructions, executable by the processor, configured to translate between the object instance and the XML document using the XML Mapping Definition.

16. A system for converting data between a relational format and an XML document, the system comprising:

a processor;

a relational database, coupled to the processor, and containing relational data;

a memory, coupled to the processor, and storing instructions for performing a method, the method comprising:

generating a XML Mapping Definition from XML or Relational metadata, wherein the XML Mapping Definition comprises information relating relational data components to XML elements and relational data fields to XML elements or XML attributes, and said generating the XML Mapping Definition comprises collapsing one or more portions of an XML hierarchy comprising the XML elements and attributes to reduce the number of tables used in the relational database;

selecting relational data from the relational database;

representing the relational data as an object instance;

converting the object instance to XML data using the XML Mapping Definition; and storing the converted object instance in the XML document.

17. The system of claim 16 wherein the memory stores further instructions for performing the method, the method further comprising:

obtaining the XML document;

converting the XML document to an object instance with the XML Mapping Definition;

representing the object instance as relational data; and placing the relational data in the relational database.

18. The system of claim 17 wherein said converting further comprises:

translating between the object instance and the XML document using the XML Mapping Definition.

* * * * *